US008458391B2

(12) United States Patent  
Itoh (10) Patent No.: US 8,458,391 B2  
(45) Date of Patent: Jun. 4, 2013

(54) LIBRARY APPARATUS AND METHOD FOR CONTROLLING THE SAME

(75) Inventor: Yoshiharu Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 13/037,966

(22) Filed: Mar. 1, 2011

(65) Prior Publication Data

US 2011/0238929 A1    Sep. 29, 2011

(30) Foreign Application Priority Data

Mar. 29, 2010   (JP) ................................. 2010-075769

(51) Int. Cl.
   *G06F 12/00*         (2006.01)
(52) U.S. Cl.
   USPC ............... 711/4; 711/112; 711/111; 711/100; 711/159; 711/E12.017; 360/71
(58) Field of Classification Search
   None
   See application file for complete search history.

(56) References Cited

U.S. PATENT DOCUMENTS

2004/0133915 A1*  7/2004  Moody et al. .................. 725/86  
2006/0106970 A1   5/2006  Matsuda et al.  
2008/0019226 A1   1/2008  Sasage et al.  
2009/0063748 A1*  3/2009  Bello et al. ......................... 711/4  
2009/0237828 A1*  9/2009  Hatabe ............................. 360/71

FOREIGN PATENT DOCUMENTS

JP    2006-139635    6/2006  
JP    2007-310618    11/2007

\* cited by examiner

*Primary Examiner* — Reginald Bragdon  
*Assistant Examiner* — Arvind Talukdar  
(74) *Attorney, Agent, or Firm* — Staas & Halsey LLP (57) ABSTRACT

A library apparatus includes a medium name storage unit that stores medium name conversion information in which a virtual medium name specifying a storage medium in a read/write request from a host is related to a real medium name specifying the storage medium in the library apparatus, a conveying mechanism unit that conveys the storage medium, a drive that reads/writes data from/to the storage medium conveyed by the conveying mechanism unit in response to the received read/write request, a conversion unit that converts the virtual medium name included in the received read/write request to the real medium name on the basis of the medium name conversion information stored in the medium name storage unit, and a conveying mechanism control unit that controls the conveying mechanism unit to convey the storage medium having the real medium name converted by the conversion unit to the drive.

7 Claims, 9 Drawing Sheets

| | | DRIVE 114a1 | | | | | | | |
|---|---|---|---|---|---|---|---|---|---|
| | | LTO-1 | | LTO-2 | | LTO-3 | | LTO-4 | |
| | | WRITE | READ | WRITE | READ | WRITE | READ | WRITE | READ |
| TAPE | LTO-1 | 1 | 1 | 1 | 1 | 0 | 1 | 0 | 0 |
| | LTO-2 | 0 | 0 | 1 | 1 | 1 | 1 | 0 | 1 |
| | LTO-3 | 0 | 0 | 0 | 0 | 1 | 1 | 1 | 1 |
| | LTO-4 | 0 | 0 | 0 | 0 | 0 | 0 | 1 | 1 |

FIG.5

| VIRTUAL MEDIUM NAME | REAL MEDIUM NAME |
|---|---|
| LT0001 | LT0002 |
| LT0005 | LT0009 |
| ⋮ | ⋮ |

| VIRTUAL MEDIUM NAME | REAL MEDIUM NAME |
|---|---|
| LT0001 | LT0002 |

| TAPE TYPE | | CONVEYANCE INSTRUCTION FROM HOST COMPUTER | | ACTUAL CONVEYING PROCESS | |
|---|---|---|---|---|---|
| EXISTING TAPE | CONVEYANCE TARGET | LTO-1 TAPE | CONVEYANCE TARGET | LTO-1 TAPE |
| | CONVEYANCE DESTINATION | LTO-1 DRIVE | CONVEYANCE DESTINATION | LTO-2 DRIVE (VIRTUAL LTO-1 DRIVE) |
| NEW TAPE | CONVEYANCE TARGET | LTO-1 TAPE | CONVEYANCE TARGET | LTO-3 TAPE (VIRTUAL LTO-1 TAPE) |
| | CONVEYANCE DESTINATION | LTO-1 DRIVE | CONVEYANCE DESTINATION | LTO-3 DRIVE (VIRTUAL LTO-1 DRIVE) |

LIBRARY APPARATUS AND METHOD FOR CONTROLLING THE SAME

CROSS-REFERENCE TO RELATED APPLICATIONS

This application is based upon and claims the benefit of priority of the prior Japanese Patent Application No. 2010-75769, filed on Mar. 29, 2010, the entire contents of which are incorporated herein by reference.

FIELD

The embodiments discussed herein are related to a library apparatus and a method for controlling the library apparatus.

BACKGROUND

There has been known a library apparatus which includes a plurality of storage media, such as magnetic tapes, a plurality of drives, and a library control unit for controlling the drives and which stores a large amount of data and provides the data when the data is used. This library apparatus mounts a predetermined storage medium on a drive in response to a request from a higher-level apparatus, such as a host computer, and reads/writes data from/to the mounted storage medium in accordance with an instruction from the higher-level apparatus.

Japanese Laid-open Patent Publication Nos. 2006-139635 and 2007-310618 are examples of related art.

Such library apparatuses are often used for long-term (several years or decades) external storage of data. Since needs for larger capacity and higher access speed accompany an increase in the amount of stored data for save and extension of time to provide data, storage medium specifications, such as a tape format, are often extended. Accordingly, the life of a storage medium tends to become shorter. For example, regarding backward compatibility of tape drives, the compatibility across generations of storage media is often limited such that reading and writing can be performed on older first generation tapes, only reading can be performed on older second generation tapes, and each of reading and writing cannot be performed on older third generation tapes and tapes older than the older third generation tapes.

Therefore, a user who wants to store data for a long term has to periodically shift the generations of storage media. Transfer of data stored in a storage medium to a new storage medium places large burdens on human resources, facility resources, and time resources for the transfer. In addition, it is preferably to ensure the consistency between management information for volumes indicating the contents of backup storage media and data stored in actual storage media. Furthermore, in order to introduce a new standard storage medium and introduce a new standard drive, it is preferably to update a relation among storage media and drives and to manage the relation.

SUMMARY

According to an aspect of the invention, a library apparatus receives a read/write request from a host to read/write data from/to a storage device. The apparatus includes a medium name storage unit that stores medium name conversion information in which a virtual medium name specifying a storage medium in the read/write request is related to a real medium name specifying the storage medium in the library apparatus, a conveying mechanism unit that conveys the storage medium, a drive that reads/writes data from/to the storage medium conveyed by the conveying mechanism unit in response to the received read/write request, a conversion unit that converts the virtual medium name included in the received read/write request to the real medium name on the basis of the medium name conversion information stored in the medium name storage unit, and a conveying mechanism control unit that controls the conveying mechanism unit to convey the storage medium having the real medium name converted by the conversion unit to the drive.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiments will be described with reference to the drawings.

First Embodiment

Figure 1:
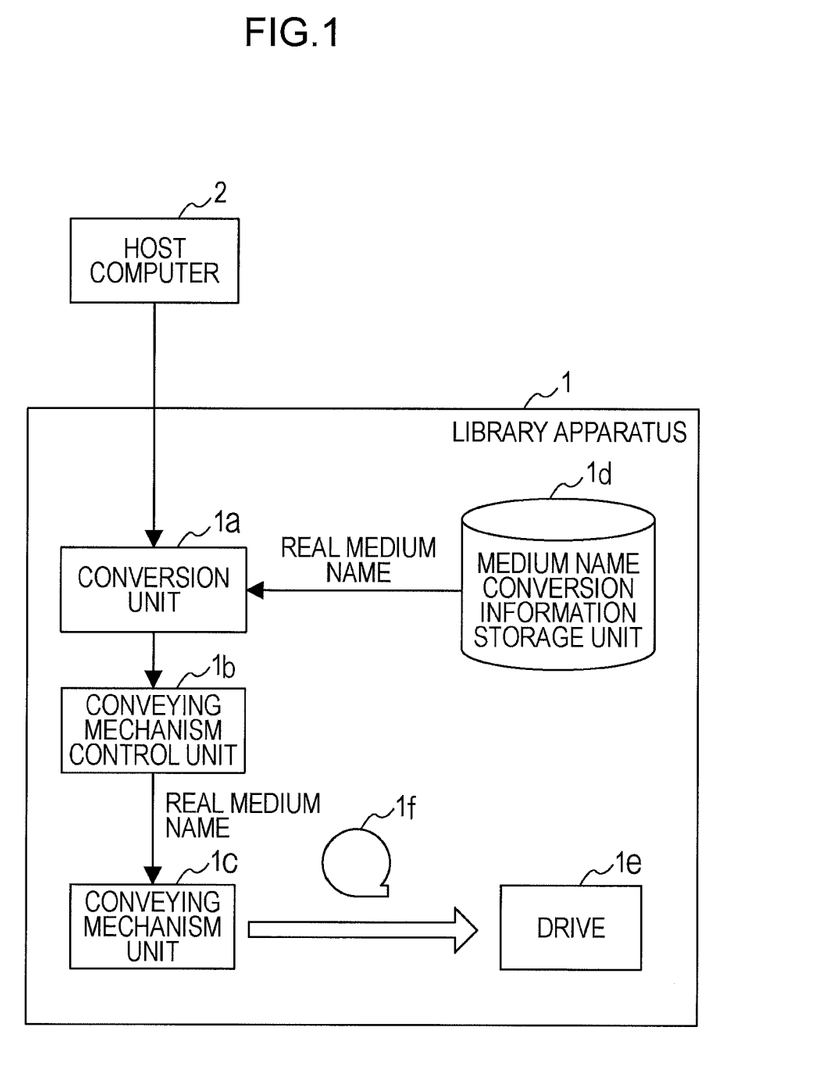
FIG. 1 is a diagram illustrating a library apparatus according to a first embodiment.

FIG. 1 illustrates a library apparatus according to a first embodiment. The library apparatus, indicated at 1, according to this embodiment is connected to a host computer 2 via a communication line. The library apparatus 1 includes a conversion unit 1a, a conveying mechanism control unit 1b, a conveying mechanism unit 1c, a medium name conversion information storage unit (which corresponds to a medium name storage unit in claims) 1d, a drive 1e, and a storage medium 1f.

The conversion unit 1a receives a read or write request (hereinafter referred as "read/write request") transmitted from the host computer 2 and converts a virtual medium name included in the read/write request from the host computer 2 to a real medium name of the storage medium 1f on the basis of medium name conversion information stored in the medium name conversion information storage unit 1d. In the library apparatus 1, the storage medium 1f is conveyed and read or written on the basis of its real medium name. On the other hand, the host computer 2 or a user using the host computer 2 specifies the storage medium 1*f* using its virtual medium name. The conversion unit 1*a* receives a read/write request, including the virtual medium name, for the storage medium 1*f* from the host computer 2, converts the virtual medium name to the real medium name, and controls the library apparatus 1 using the real medium name during a process based on the read/write request for the storage medium 1*f*.

The conveying mechanism control unit 1*b* controls the conveying mechanism unit is so that the conveying mechanism unit 1*c* conveys the storage medium 1*f*. The conveying mechanism control unit 1*b* controls on the basis of the real medium name converted by the conversion unit 1*a* so that the conveying mechanism unit 1*c* conveys the storage medium 1*f* to the drive 1*e*.

The conveying mechanism unit 1*c* conveys the storage medium if from a medium cabinet (not illustrated) to the drive 1*e* and also conveys the storage medium 1*f* from the drive 1*e* to the medium cabinet under the control of the conveying mechanism control unit 1*b*.

The medium name conversion information storage unit 1*d* stores the medium name conversion information in which the virtual medium name specifying the storage medium 1*f* in the read/write request transmitted from the host computer 2 is related to the real medium name specifying the storage medium 1*f* in the library apparatus 1.

The drive 1*e* reads or writes data from or to (Hereinafter referred as "reads/writes data from/to") the storage medium 1*f* conveyed by the conveying mechanism unit is in response to the read/write request transmitted from the host computer 2.

As described above, in the library apparatus 1, the conversion unit is converts the virtual medium name included in the read/write request from the host computer 2 to the real medium name of the storage medium 1*f* on the basis of the medium name conversion information. Thus, the storage medium 1*f* can be managed using the virtual medium name outside the library apparatus 1 and can be managed using the real medium name inside the library apparatus 1. If data stored in the storage medium 1*f* is transferred to another storage medium, the virtual medium name can be taken over. Advantageously, an increase in burden of generation management for the storage medium 1*f* can be suppressed.

Second Embodiment

Figure 2:
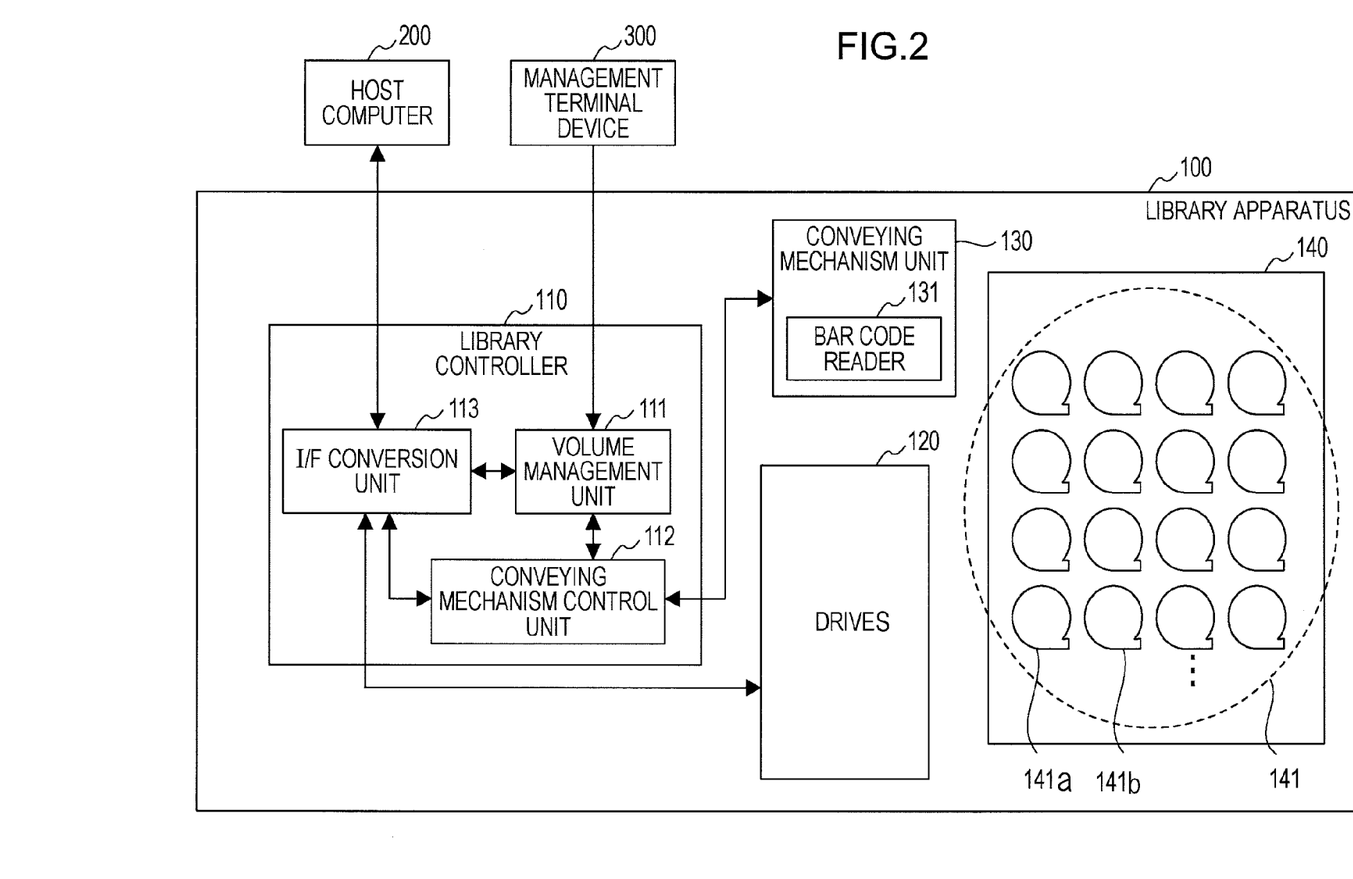
FIG. 2 is a diagram illustrating a library apparatus according to a second embodiment.

FIG. 2 illustrates a library apparatus according to a second embodiment. The library apparatus employing the LTO (Linear Tape Open) system, indicated at 100, includes a library controller 110, drives 120, a conveying mechanism unit 130, and a cartridge tape cabinet 140. The library apparatus 100 is connected to a host computer 200 and a management terminal device 300 via communication lines of, for example, a LAN.

In response to a read/write request for one of tapes 141 (for example, a tape 141*a*) transmitted from the host computer 200, the library apparatus 100 allows the conveying mechanism unit 130 to obtain and convey the tape 141*a* from the cartridge tape cabinet 140 to one of the drives 120 and then mount the tape 141*a* onto one of the drives 120. The library apparatus 100 reads/writes data from/to the tape 141*a* mounted on one of the drives 120 in response to the request from the host computer 200. After data reading/writing is completed, the library apparatus 100 allows one of the drives 120 to eject the tape 141*a* and allows the conveying mechanism unit 130 to return the tape 141*a* to the original position in the cartridge tape cabinet 140. In the library apparatus 100 according to this embodiment, magnetic tapes of the LTO system are used as storage media. The storage medium is not limited to it. Another storage medium, e.g., an optical disc such as a compact disc (CD)-rewritable (R/W), a digital versatile disc (DVD)-R/W, or a DVD-random access memory (RAM), a magnetic disk such as a hard disk drive (HDD), or a large-capacity semiconductor memory may be used.

The library controller 110 controls components of the library apparatus 100 in accordance with a request from the host computer 200. The library controller 110 also manages information about the tapes 141 stored in the cartridge tape cabinet 140. The library controller 110 includes a volume management unit 111, a conveying mechanism control unit 112, and an interface (I/F) conversion unit 113.

The volume management unit 111 manages, for example, identification information for identifying each of the tapes 141 stored in the cartridge tape cabinet 140 and information indicating the contents of each of the tapes 141.

The conveying mechanism control unit 112 transmits a request, stored through the I/F conversion unit 113 from the host computer 200, to the conveying mechanism unit 130, thus giving an operation instruction to the conveying mechanism unit 130. The conveying mechanism unit 130 operates on the basis of the operation instruction. The conveying mechanism control unit 112 also transmits the result of operation of the conveying mechanism unit 130 to the I/F conversion unit 113. A response to the request from the host computer 200 is transmitted to the host computer 200 on the basis of the operation result.

The I/F conversion unit 113 performs communication with the host computer 200 in conformity with a specific interface protocol. A request transmitted from the host computer 200 is interpreted by the I/F conversion unit 113 and is then transmitted to the volume management unit 111 and the conveying mechanism control unit 112. The I/F conversion unit 113 also transmits a response indicating a result obtained in the library apparatus 100 to the request from the host computer 200 to the host computer 200.

The drives 120 include drives of different generations corresponding to tapes of different generations. One of the drives 120 reads/writes data from/to the tape 141*a* in accordance with a request from the host computer 200. The conveying mechanism unit 130 conveys a tape between the cartridge tape cabinet 140 and one of the drives 120 in accordance with an instruction of the conveying mechanism control unit 112, based on a request from the host computer 200. When the library apparatus 100 is started up, when the tape 141*a* is stored into the cartridge tape cabinet 140, or at arbitrary time specified by the user, the conveying mechanism unit 130 allows a bar code reader 131 to scan the cartridge tape cabinet 140 and read a bar code attached to each of the tapes 141 to confirm the presence or absence of the tape and then transmits the result of confirmation to the library controller 110. The volume management unit 111 receives the confirmation result to generate or update tape management information.

The conveying mechanism unit 130 holds and conveys the tape 141*a* on the basis of an instruction from the library controller 110. The conveying mechanism unit 130 includes the bar code reader 131. The bar code reader 131 reads the bar code on the tape 141*a* to obtain information about the tape, e.g., the name of the tape.

The cartridge tape cabinet 140 stores the tapes 141, e.g., the tapes 141*a* and 141*b*, in predetermined positions. Each of the tapes 141 stored in the cartridge tape cabinet 140 is provided with a cartridge memory, serving as a non-contact IC tag, for storing mount history, the amount of recorded data, and statistical information, such as error information. On each of the tapes 141 stored in the cartridge tape cabinet 140, a bar code label produced according to a specific naming rule is placed.

The position of each tape is determined. After the tape 141a is used, the tape 141a is stored in the same position before use. Each of the tapes 141 is related to the drives 120 available for data reading/writing on the basis of a rule set by the user.

The host computer 200 executes a task using stored data. The host computer 200 also requests the library apparatus 100 to read/write data from/to the tape 141a.

The management terminal device 300 is used to set or update information, used by the user of the library apparatus 100, for management of the rules, tapes, and volumes.

Figure 3:
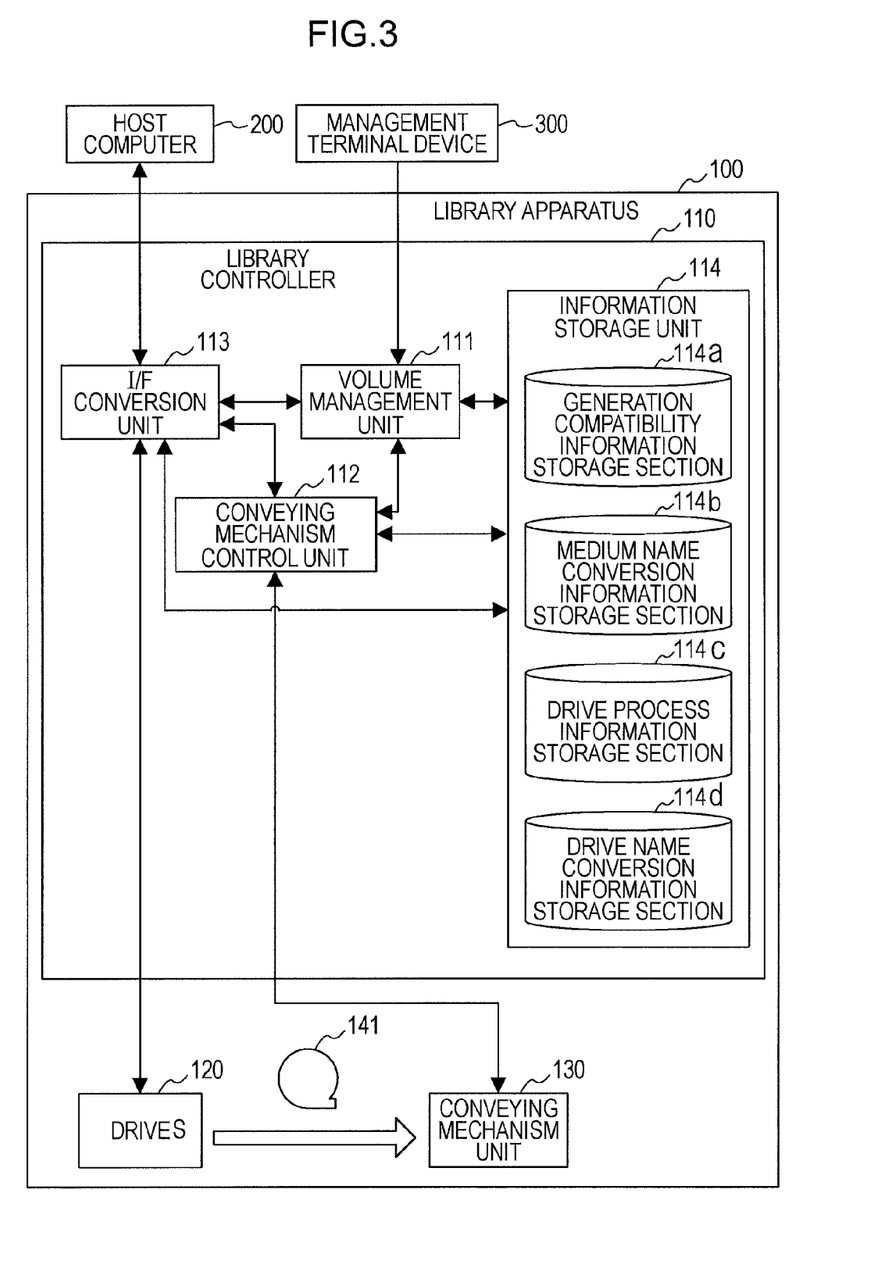
FIG. 3 is a block diagram illustrating functions of a library controller in the second embodiment.

FIG. 3 is a block diagram illustrating functions of the library controller 110 in the second embodiment. The library controller 110, included in the library apparatus 100 according to this embodiment, includes the volume management unit 111, the conveying mechanism control unit 112, the I/F conversion unit 113 and an information storage unit 114. The information storage unit 114 includes a generation compatibility information storage section 114a, a medium name conversion information storage section (which corresponds to a medium name storage unit in claims 114b, a drive process information storage section 114c, and a drive name conversion information storage section (which corresponds to a drive name storage unit in claims 114d.

The volume management unit 111 sets or updates generation compatibility information stored in the generation compatibility information storage section 114a included in the information storage unit 114, medium name conversion information stored in the medium name conversion information storage section 114b, drive process information stored in the drive process information storage section 114c and drive name conversion information stored in the drive name conversion information storage section 114d on the basis of an operation in the management terminal device 300 by a manager.

When data transfer is performed, namely, when all of data items stored in a source tape are transferred to a destination tape, the volume management unit 111 updates the medium name conversion information stored in the medium name conversion information storage section 114b so that the virtual medium name of the source tape is related to a real medium name of the destination tape. The data transfer is performed by a transfer process, which will be described in detail below with reference to FIG. 10.

When the data transfer is performed, the conveying mechanism control unit 112 controls the conveying mechanism unit 130 so that the conveying mechanism unit 130 conveys the latest generation tape as the destination tape to one of the drives 120.

The conveying mechanism control unit 112 controls the conveying mechanism unit 130. When the host computer 200 transmits a request to read/write data from/to the tape 141a, the conveying mechanism control unit 112 controls the conveying mechanism unit 130 so that the conveying mechanism 130 conveys, on the basis of a real medium name converted by the I/F conversion unit 113, the tape 141a to one of the drives 120 specified using a real drive name converted by the I/F conversion unit 113.

After the data transfer, the conveying mechanism control unit 112 controls the conveying mechanism conveying mechanism 130 so that the conveying mechanism 130 stores the destination tape, to which the data has been transferred from the source tape, in the position where the source tape was stored in the cartridge tape cabinet 140.

When data reading/writing is performed on a tape, e.g., the tape 141a, in response to a read/write request from the host computer 200 or during execution of data transfer, the conveying mechanism control unit 112 refers to the generation compatibility information stored in the generation compatibility information storage section 114a and controls the conveying mechanism unit 130 so that the conveying mechanism 130 conveys the tape to the latest generation drive of the drives 120 available for data reading/writing on the tape.

The I/F conversion unit 113 receives a read/write request transmitted from the host computer 200 and converts a virtual medium name included in the read/write request from the host computer 200 to a real medium name on the basis of the medium name conversion information stored in the medium name conversion information storage section 114b.

The I/F conversion unit 113 receives the read/write request and converts a virtual drive name included in the read/write request to the real drive name of one of the drives 120 on the basis of the drive name conversion information stored in the drive name conversion information storage section 114d.

The I/F conversion unit 113 converts the real medium name of the tape 141a used for data reading/writing based on the read/write request to the virtual medium name on the basis of the medium name conversion information stored in the medium name conversion information storage section 114b and then transmits a report to the read/write request to the host computer 200.

The generation compatibility information storage section 114a stores the generation compatibility information indicating which generation of the tapes is available for the drive of each generation.

The medium name conversion information storage section 114b stores the medium name conversion information in which a virtual medium name specifying a tape in a read/write request transmitted from the host computer 200 is related to a real medium name specifying a tape in the library apparatus 100.

The drive process information storage section 114c stores the drive process information indicating the virtual medium name and the real medium name of the tape 141a which is being subjected to data reading/writing in response to the read/write request.

The drive name conversion information storage section 114d stores the drive name conversion information in which a virtual drive name specifying a drive in a read/write request is related to a real drive name specifying a drive in the library apparatus.

One of the drives 120 reads/writes data from/to the tape 141a conveyed by the conveying mechanism unit 130 in a response to the read/write request transmitted from the host computer 200.

In this embodiment, the tape 141a is conveyed by the conveying mechanism unit 130 to the latest generation drive of the drives available for data reading/writing data from/to the tape 141a in response to the read/write request from the host computer 200. The latest generation drive of the available generation drives reads/writes data from/to the tape 141a.

The conveying mechanism unit 130 conveys the tape 141a used for data reading/writing from the cartridge tape cabinet 140 to one of the drives 120 under the control of the conveying mechanism control unit 112. When data reading/writing on the tape 141a is completed, the conveying mechanism unit 130 also conveys the tape 141a from one of the drives 120 to the cartridge tape cabinet 140 and stores the tape in the predetermined position.

The cartridge tape cabinet 140 is disposed in the library apparatus 100 and stores the tapes used in the library apparatus 100. Each tape is stored in its predetermined position. The cartridge tape cabinet 140 stores the tapes of the different generations available in the library apparatus 100.

Figure 4:
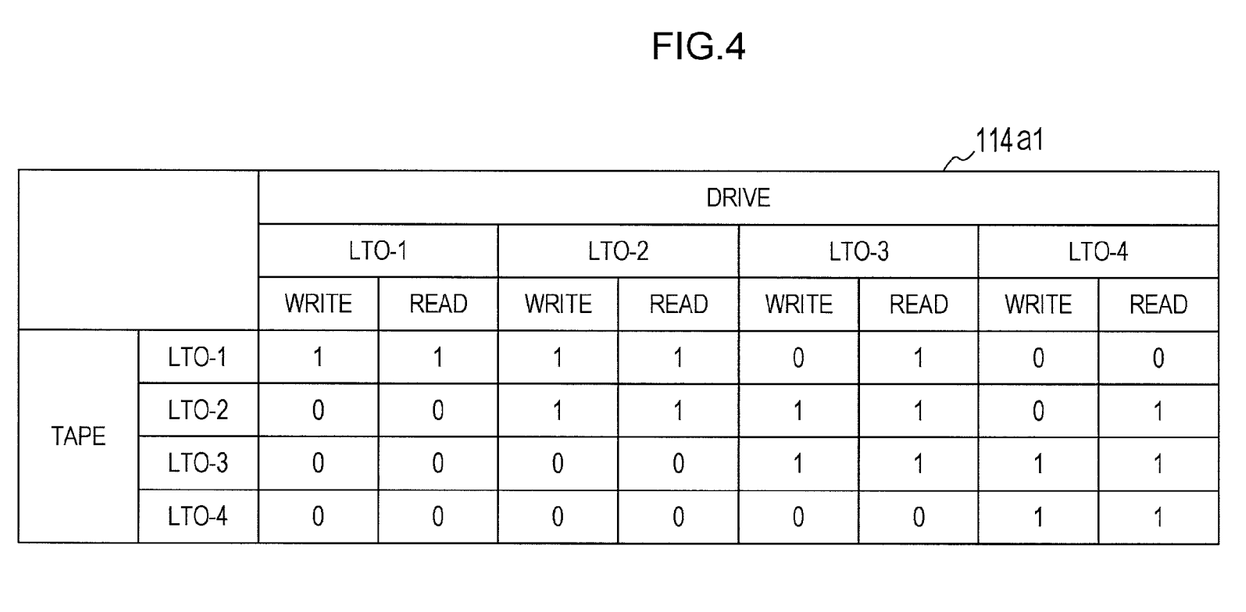
FIG. 4 is a diagram illustrating a generation compatibility table in the second embodiment.

FIG. 4 illustrates a generation compatibility table in the second embodiment. The generation compatibility table, indicated at 114a1, is stored in the generation compatibility information storage section 114a included in the library controller 110. The generation compatibility table 114a1 is created and managed by the volume management unit 111 in the library controller 110 in accordance with, for example, a user's operation on the management terminal device 300. The generation compatibility table 114a1 stores the generation compatibility information defining the relationship among the tapes 141 and the drives 120 used in the library apparatus 100.

The generation compatibility table 114a1 includes, as items, generations "LTO-1", "LTO-2", "LTO-3", and "LTO-4" for the tapes 141 and the drives 120 and further includes items "READ" and "WRITE" for the combinations of the generations of the tapes 141 and the drives 120. In the generation compatibility table 114a1, information blocks of the items arranged in the lateral direction are related to each other as generation compatibility information.

In the LTO system, for backward compatibility across the generations of the drives, it is assumed that the same generation and older first generation tapes are readable and writable, the older second generation tapes are readable only, and the older third generation tapes and tapes older than the older third generation tapes are not readable and not writable.

For combination of each generation of the tapes 141 and that of the drives 120, a value "1" is set in the item "WRITE" when data writing can be performed and a value "0" is set in the item "WRITE" when data writing cannot be performed. Similarly, "1" is set in the item "READ" when data reading can be performed and "0" is set in the item "READ" when data reading cannot be performed.

For example, when the generation of one of the tapes 141 is "LTO-1" and that of one of the drives 120 is "LTO-1", "1" is set in "WRITE" and "1" is set in "READ" because the generation of one of the tapes 141 is the same as that of one of the drives 120 and both of reading and writing can be performed. When the generation of one of the tapes 141 is "LTO-1" and that of one of the drives 120 is "LTO-3", the generation of one of the tapes 141 is older than that of one of the drives 120 by two generations, writing to one of the tapes 141 cannot be made, and reading from one of the tapes 141 can be performed. Thus, "0" is set in "WRITE" and "1" is set in "READ". When the generation of one of the tapes 141 is "LTO-2" and that of one of the drives 120 is "LTO-1", the generation of one of the tapes 141 is newer than that of one of the drives 120 and each of reading and writing on one of the tapes 141 cannot be made. Thus, "0" is set in "WRITE" and "0" is set in "READ".

Figure 5:
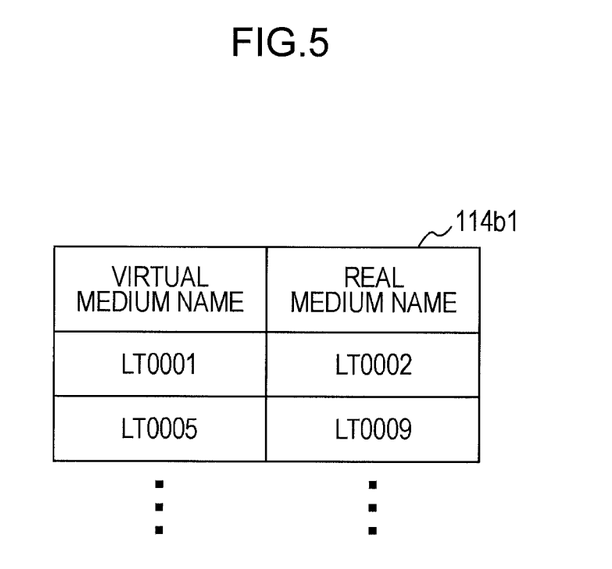
FIG. 5 is a diagram illustrating a medium name conversion table in the second embodiment.

FIG. 5 illustrates a medium name conversion table in the second embodiment. The medium name conversion table, indicated at 114b1, illustrated in FIG. 5 is stored in the medium name conversion information storage section 114b included in the library controller 110. The medium name conversion table 114b1 is created and managed by the volume management unit 111 in the library controller 110 in accordance with a user's operation on the management terminal device 300. The medium name conversion table 114b1 stores medium name conversion information used for conversion between each virtual medium name used in the host computer 200 and the real medium name of one of the tapes 141 used in the library apparatus 100.

The medium name conversion table 114b1 includes, as items, "VIRTUAL MEDIUM NAME" and "REAL MEDIUM NAME". In the medium name conversion table 114b1, information blocks of the items arranged in the lateral direction are related to each other as medium name conversion information.

A virtual medium name is given to each tape 141 so that the host computer 200 or the user identifies one of the tapes 141 used in the library apparatus 100 as a virtual tape. Each virtual medium name is uniquely given to the corresponding tape at each time point. In some cases, the virtual medium name may be changed owing to the transfer, discard, or exchange of data stored in the tape accompanying the replacement of tape generations. As for changing a virtual medium name related to a tape in which data is stored, the virtual medium name given to the source tape is passed to a destination tape, to which the data is transferred, so that the host computer 200 or the user can use the library apparatus 100 without being aware of the change.

A real medium name is given to each tape 141 so that the library apparatus 100 identifies one of the tapes 141 used therein as a real tape. Each real medium name is uniquely given to the corresponding tape and is not changed in principle. The real medium name is recorded on a bar code label or a cartridge memory provided for the corresponding tape and is readable by one of the drives 120 or the conveying mechanism unit 130.

The virtual medium name and real medium name of each tape 141 are converted to each other through the I/F conversion unit 113 on the basis of the medium name conversion information. For example, when the host computer 200 transmits a data read request including data indicating the virtual medium name of a target tape, from which data is to be read, to the library controller 110, the I/F conversion unit 113 converts the virtual medium name to the corresponding real medium name with reference to the medium name conversion table 114b1 stored in the medium name conversion information storage section 114b, and controls the library apparatus 100 on the basis of the obtained real medium name. When the library controller 110 transmits a response to the request to the host computer 200, the I/F conversion unit 113 converts the real medium name to the corresponding virtual medium name with reference to the medium name conversion table 114b1 stored in the medium name conversion information storage section 114b, and responds to the host computer 200 on the basis of the obtained virtual medium name.

The drive name conversion information indicating the relationship among virtual drive names and real drive names, described above with reference to FIG. 3, is stored in a drive name conversion table configured in a similar to the medium name conversion table 114b1. Explanation of the drive name conversion table is omitted.

Figure 6:
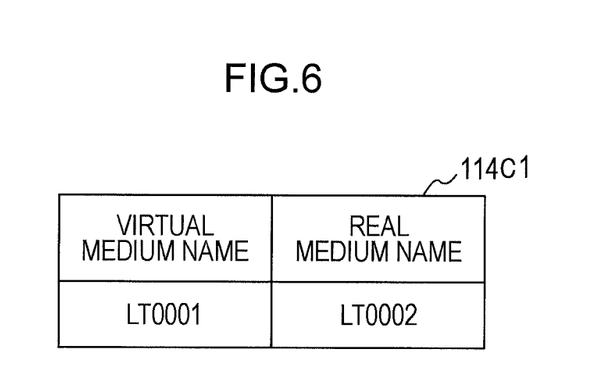
FIG. 6 is a diagram illustrating a drive process table in the second embodiment.

FIG. 6 illustrates a drive process table in the second embodiment. The drive process table, indicated at 114c1 in FIG. 6, is stored in the drive process information storage section 114c included in the library controller 110. The drive process table 114c1 is created and managed by the volume management unit 111 in the library controller 110 on the basis of, for example, mounting one of the tapes 141 on one of the drives 120 in the library apparatus 100. The drive process table 114c1 stores drive process information indicating the virtual medium name and real medium name of one of the tapes 141 which is mounted on one of the drives 120 and which data reading/writing is performed on.

The drive process table 114c1 includes, as items, "VIRTUAL MEDIUM NAME" and "REAL MEDIUM NAME". In the drive process table 114c1, information blocks of the items arranged in the lateral direction are related to each other as drive process information.

The virtual medium name is that of one of the tapes 141 which is currently mounted on one of the drives 120. The real medium name is that of one of the tapes 141 which is currently mounted on one of the drives 120.

When one of the tapes 141 is mounted onto one of the drives 120, the virtual medium name and real medium name of one of the tapes 141 obtained on the basis of the medium name conversion information are set as drive process information. When one of the tapes 141 is ejected from one of the drives 120, the drive process information is deleted.

A conveying process in the library apparatus 100 based on a tape conveyance request including a virtual medium name transmitted from the host computer 200 will be described.

Figure 7:
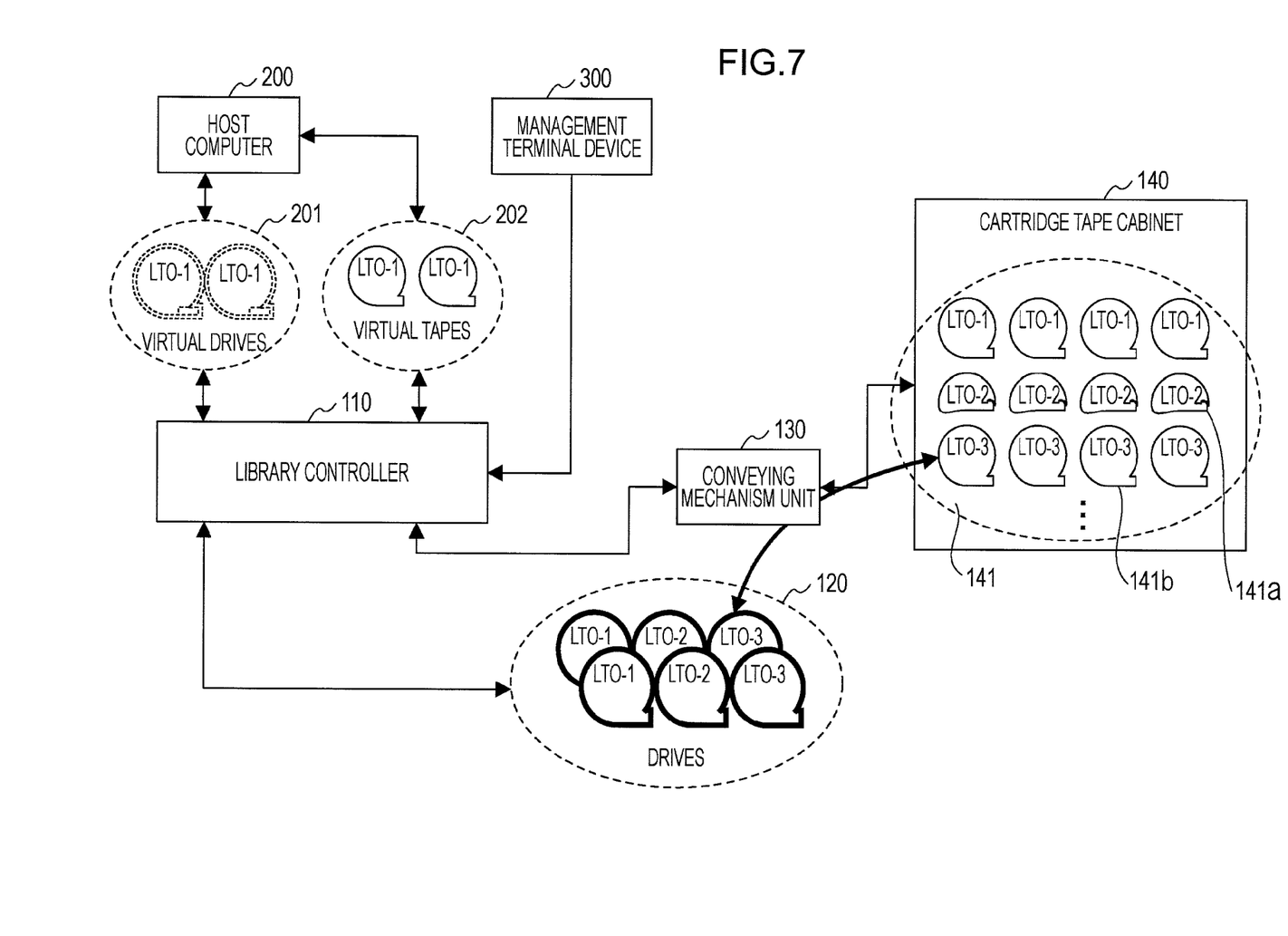
FIG. 7 is a diagram illustrating an operation of the library apparatus according to the second embodiment.
Figure 8:
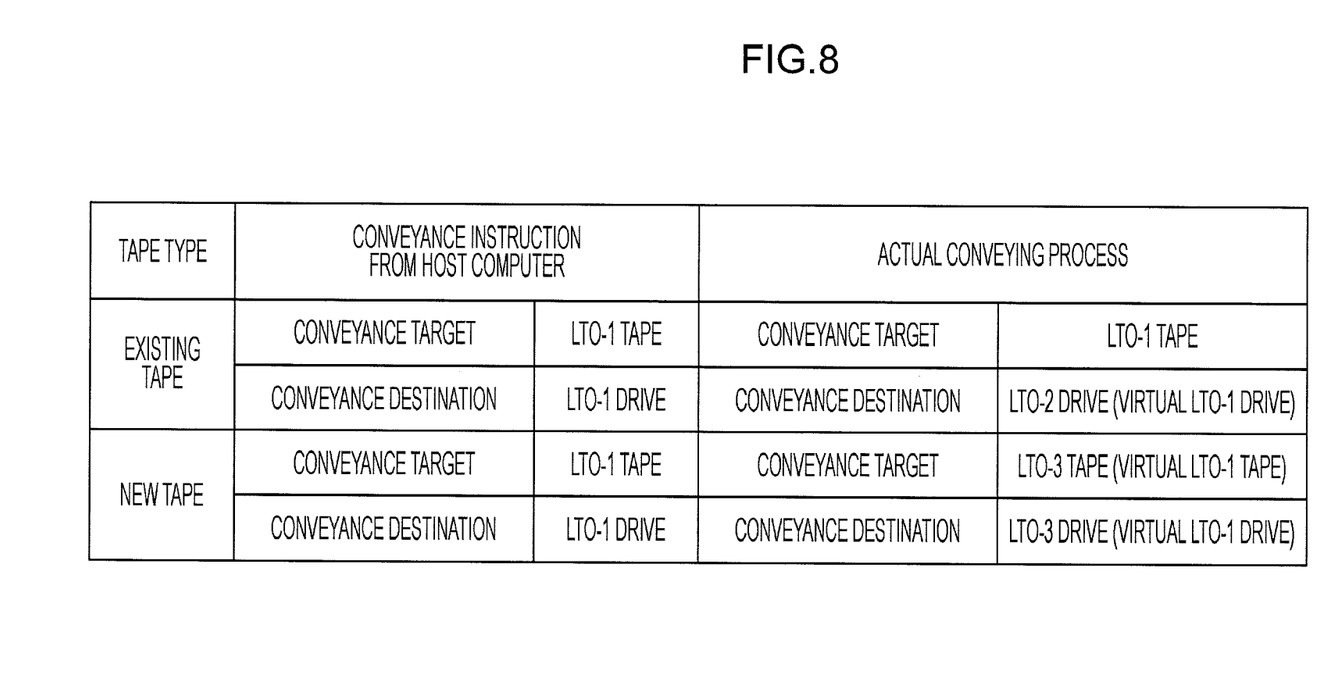
FIG. 8 is a diagram illustrating the relationship among tapes and drives in a conveyance request from a host computer and an actual conveying process in the second embodiment.

FIG. 7 illustrates an operation of the library apparatus according to the second embodiment. FIG. 8 illustrates the relationship among the tapes and the drives in a conveyance request from the host computer and an actual conveying process in the second embodiment. The operation of the library apparatus 100 according to this embodiment will be described with reference to FIGS. 7 and 8.

In the library apparatus 100 according to the present embodiment, it is assumed that the tapes 141 of LTO-1, LTO-2, and LTO-3, namely, three generations are simultaneously used in the library apparatus 100. It is also assumed that the drives 120 of LTO-1, LTO-2, and LTO-3, namely, three generations are used in the library apparatus 100 and two drives are used for each generation.

Furthermore, it is assumed that the manager sets the virtual medium name of each tape 141 recognized in the host computer 200, the number of virtual drives, and the virtual drive names. It is also assumed that all of virtual tapes 202 set in the host computer 200 are LTO-1 tapes. In addition, it is assumed that virtual drives 201 set in the host computer 200 are two drives of LTO-1 generation alone.

The generation of the virtual tapes 202 does not have to be identical to that of real tapes. The generation of the virtual tapes 202 can be arbitrarily set. Similarly, the generation of the virtual drives 201 does not have to be identical to that of real drives. The generation of the virtual drives 201 can be arbitrarily set.

Referring to FIG. 7, the manager of the library apparatus 100 registers the real drive name, used specifically in the library apparatus 100, of each drive 120 used in the library apparatus 100 and the virtual drive name thereof used in specifically in the host computer 200 in the drive name conversion table using the management terminal device 300. In addition, the manager registers the real medium name, used specifically in the library apparatus 100, of each tape and the virtual medium name thereof used specifically in the host computer 200 in the medium name conversion table. For example, upon replacement of tapes, the manager may update the virtual medium name of the tape registered in the medium name conversion information.

In this embodiment, as illustrated in FIG. 8, a conveying process to be actually performed differs depending on whether a tape specified by a request from the host computer 200 is an existing tape in which data has already been stored or a new tape in which data is not yet written.

When receiving a read/write request for an existing tape from the host computer 200, the library controller 110 in this embodiment determines the latest generation drive available for data reading/writing on the existing tape specified by the request as a drive used for data reading/writing on the tape. When receiving a request to use a new tape or a request which does not specify a tape from the host computer 200, the library controller 110 determines an empty tape of the latest generation as a tape used and also determines the latest generation drive available for data reading/writing on the determined tape as a drive used.

First, a case where a read/write request for an existing tape is received from the host computer 200 will be described. For example, it is assumed that the tape 141*a* is a real tape corresponding to the virtual tape 202 and is an existing LTO-2 tape. It is also assumed that the host computer 200 has transmitted a request to read/write data from/to the virtual tape 202, which is the virtual LTO-1 tape, using the LTO-1 virtual drive 201. In response to this request, the library apparatus 100 converts the virtual medium name specifying the virtual tape 202 to the real medium name on the basis of the medium name conversion information. Then, the library apparatus 100 controls the conveying mechanism unit 130 so that the conveying mechanism 130 conveys the tape 141*a*, specified by the real medium name, to the above-described determined generation drive. Since the generation of the tape 141*a* is LTO-2, the latest generation drive of the drives available for data reading/writing is the LTO-2 drive on the basis of the generation compatibility information.

Subsequently, a case where writing on a new tape is requested will be described. For example, it is assumed that the tape 141*b* is a real tape corresponding to the virtual tape 202 and is a new LTO-3 tape. It is also assumed that the host computer 200 has transmitted a request for writing on the virtual tape 202, which is the virtual LTO-1 tape, using the virtual LTO-1 drive 201. In response to this request, the library apparatus 100 converts the virtual medium name, specifying the virtual tape 202, to the real medium name on the basis of the medium name conversion information. In this case, the latest generation tape is determined as a newly used tape as described above. For this determination, it is assumed that the tape 141*b* of the latest generation LTO-3 is determined as a tape used for writing. The library apparatus 100 controls the conveying mechanism unit 130 so that the conveying mechanism 130 conveys the tape 141*b* specified by the real medium name to the drive determined as a drive used for the new tape as described above. Since the generation of the tape 141*b* is LTO-3, the LTO-3 drive is determined as the latest generation drive of the drives available for data reading/writing on the basis of the generation compatibility information.

Consequently, the library controller 110 controls the conveying mechanism unit 130 on the basis of the real medium name of each tape so that the conveying mechanism 130 conveys the tape to a drive of the generation used for data reading/writing on the tape. The drive, serving as a conveyance destination, reads/writes the conveyed tape based on a request from the host computer 200.

Figure 9:
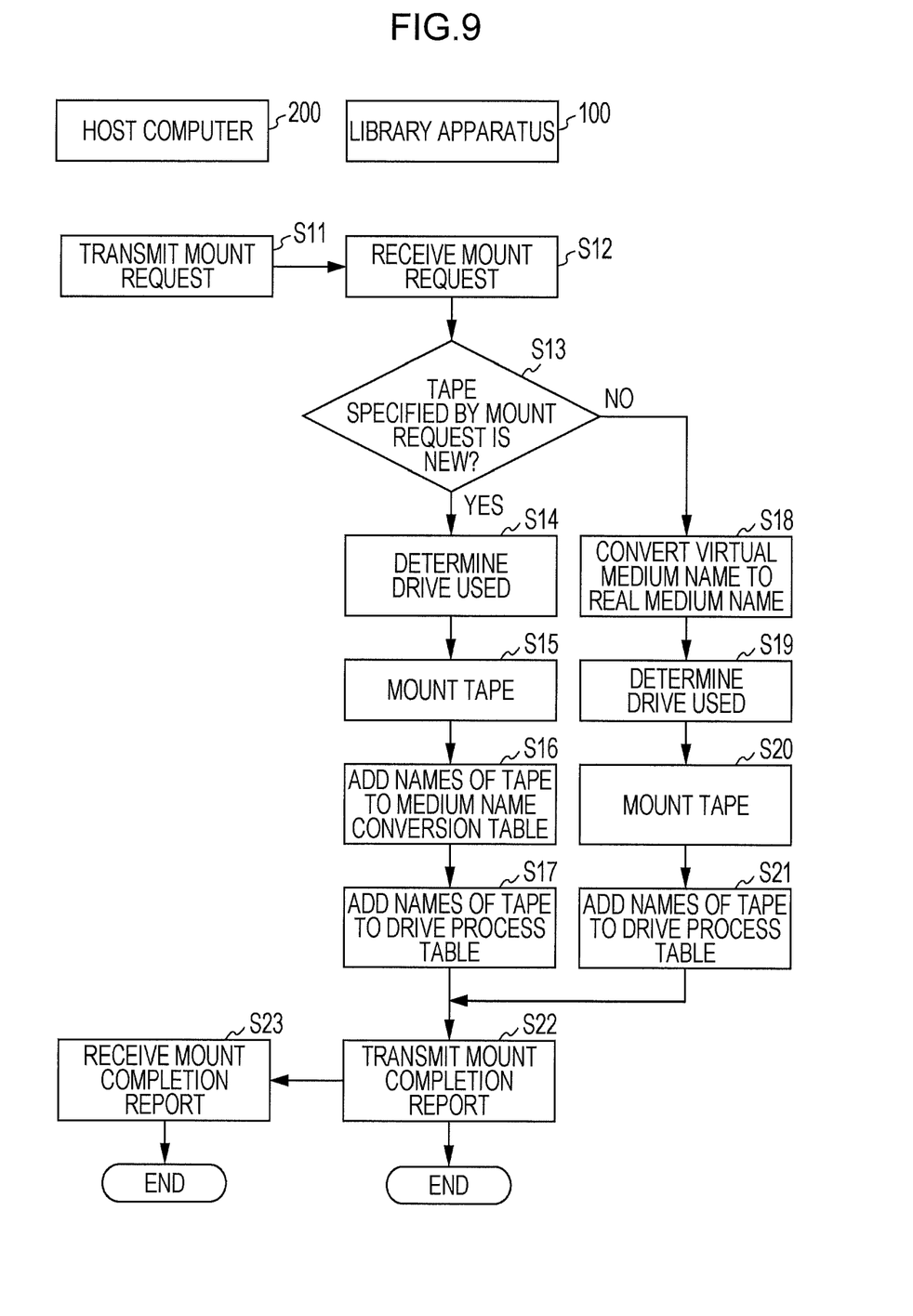
FIG. 9 is a sequence diagram illustrating the flow of a process according to the second embodiment.

FIG. 9 is a sequence diagram illustrating the flow of a process according to the second embodiment. A process performed when a tape is mounted so that the library apparatus 100 according to this embodiment performs data reading/writing in response to a request from the host computer 200 will be described with reference to step numbers of the sequence diagram of FIG. 9.

In step S11, the host computer 200 transmits a mount request which specifies a tape to be subjected to data reading/writing using its virtual medium name to the library apparatus 100.

In step S12, the I/F conversion unit 113 receives the mount request transmitted from the host computer 200 in step S11.

In step S13, the I/F conversion unit 113 determines whether the tape specified by the mount request received in step S12 is new or existing. If the tape specified by the mount request is new (YES in step S13), the process proceeds to step S14.

Whereas, if the tape specified by the mount request is existing (NO in step S13), the process proceeds to step S18.

The I/F conversion unit 113 determines whether the tape is new or existing is determined on the basis of whether the virtual medium name in the request is included in the medium name conversion table 114b1. If the virtual medium name in the request is not included in the medium name conversion table 114b1, the tape can be determined as new. Whereas, if the virtual medium name in the request is included in the table, the tape can be determined as existing. When the virtual medium name is not included in the request, the tape may be determined as new.

In step S14, the I/F conversion unit 113 determines a drive used for data reading/writing on the tape. In this embodiment, the latest generation (for example, LTO-3) tape is used as a new tape, as described with reference to FIGS. 7 and 8. As for the drive used for data reading/writing on the tape, the latest generation (for example, LTO-3) drive available for data reading/writing is determined on the basis of the generation of the tape, as described above.

In step S15, the conveying mechanism control unit 112 controls the conveying mechanism unit 130 so that the conveying mechanism 130 mounts the tape onto the drive determined in step S14. Thus, the tape is mounted on the determined drive by the conveying mechanism unit 130.

In step S16, the volume management unit 111 obtains the real medium name of the mounted tape, creates medium name conversion information on the basis of the obtained real medium name of the tape and the virtual medium name thereof, and adds the medium name conversion information to the medium name conversion table 114b1.

In step S17, the volume management unit 111 obtains the real medium name of the mounted tape, creates drive process information on the basis of the obtained real medium name of the tape and the virtual medium name thereof, and adds the drive process information to the drive process table 114c1.

In step S18, the I/F conversion unit 113 converts the virtual medium name included in the mount request received in step S12 to the real medium name on the basis of the medium name conversion information.

In step S19, the I/F conversion unit 113 determines a drive used for data reading/writing on the tape determined as existing in step S13. The generation of the existing tape is the generation (for example, LTO-1) of the tape specified by the real medium name obtained in step S18. As for the drive used for data reading/writing on the tape, the latest generation (for example, LTO-2) drive available for data reading/writing on the existing tape is determined on the basis of the generation of the tape, as described above with reference to FIGS. 7 and 8.

In step S20, the conveying mechanism control unit 112 controls the conveying mechanism unit 130 so that the conveying mechanism 130 mounts the tape onto the drive determined in step S19. Thus, the tape is mounted on the determined drive by the conveying mechanism unit 130.

In step S21, the volume management unit 111 obtains the real medium name of the mounted tape, creates drive process information on the basis of the obtained real medium name of the tape and the virtual medium name thereof, and adds the drive process information to the drive process table 114c1.

In step S22, the conveying mechanism control unit 112 confirms that mounting the tape on the drive is completed and then transmits a mount completion report to the host computer 200 through the I/F conversion unit 113. At this time, the I/F conversion unit 113 converts the real medium name to the virtual medium name on the basis of the medium name conversion information and also converts the real drive name to the virtual drive name. The mount completion report includes the converted virtual medium name and the converted virtual drive name. The I/F conversion unit 113 then transfers the mount completion report to the host computer 200. After that, the mounting process in the library apparatus 100 terminates.

In step S23, the host computer 200 receives the mount completion report from the library apparatus 100. After that, the mounting process in the host computer 200 terminates. Thus, the host computer 200 can request a process for data reading/writing on the tape mounted on the drive.

When data reading/writing requested by the host computer 200 is completed, the library controller 110 allows the drive to eject the tape and controls the conveying mechanism unit 130 so that the tape is stored in a predetermined position in the cartridge tape cabinet 140.

Figure 10:
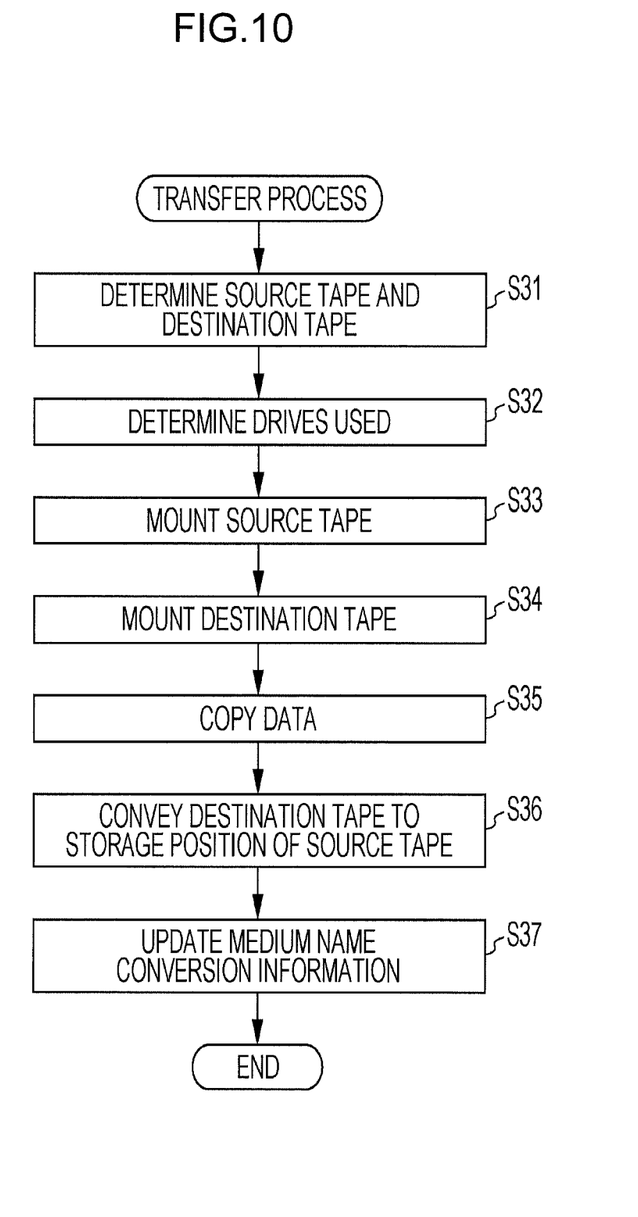
FIG. 10 is a flowchart illustrating a transfer process in the second embodiment.

FIG. 10 is a flowchart illustrating a transfer process in the second embodiment. To perform data transfer so as to copy all of data stored in an old generation tape to a new generation tape, the library apparatus 100 according to the present embodiment executes the transfer process, for example, when receiving an instruction from the manager, when a predetermined time is elapsed, or when the new generation tape is stored into the cartridge tape cabinet 140. The transfer process illustrated in FIG. 10 will be described with reference to step numbers of the flowchart.

In step S31, the I/F conversion unit 113 determines a source tape, serving as the old generation tape in which data is stored, and a destination tape, serving as the new generation tape to which the data is to be copied and which is unused. A tape selected as the source tape belongs to a generation to be replaced with a newer generation because, for example, a drive of this generation is an old type and is to be discarded, or it is hard to get tapes of the same generation. The manager may specify a source tape and the library apparatus 100 may determine the source tape on the basis of the specification of the manager. As for the destination tape, the latest generation tape is determined as a tape used.

In step S32, the I/F conversion unit 113 determines a drive used for data reading/writing on the source tape and a drive used for data reading/writing on the destination tape. As for the drive used for data reading/writing on the source tape and that used for data reading/writing on the destination tape, the latest generation drive available for data reading/writing on each tape is determined.

In step S33, the conveying mechanism control unit 112 controls the conveying mechanism unit 130 so that the conveying mechanism 130 mounts the source tape onto the drive, determined in step S32, used for data reading/writing on the source tape. Thus, the source tape is mounted on the drive used for data reading/writing on the source tape by the conveying mechanism unit 130.

In step S34, the conveying mechanism control unit 112 controls the conveying mechanism unit 130 so that the conveying mechanism 130 mounts the destination tape onto the drive, determined in step S32, used for data reading/writing on the destination tape. Thus, the destination tape is mounted on the drive used for data reading/writing on the destination tape by the conveying mechanism unit 130.

In step S35, the drives 120 copy data from the source tape to the destination tape. At this time, data is read from the source tape mounted in step S33 on the drive used for data reading/writing on the source tape and the read data is written into the destination tape mounted in step S34 on the drive used for data reading/writing on the destination tape.

In step S36, when copying the data in step S35 is completed, the conveying mechanism control unit 112 conveys the destination tape to a position where the source tape was stored in the cartridge tape cabinet 140. Thus, the destination tape is stored in the position of the source tape. The source tape may be discarded or may be stored in another position in the cartridge tape cabinet 140.

In step S37, the volume management unit 111 rewrites the real medium name of the source tape included in the medium name conversion information with that of the destination tape to update the medium name conversion information. Then, the transfer process terminates. After that, when the host computer 200 transmits a request relevant to the source tape, the library apparatus 100 performs a process based on the request using the destination tape and also responds to the host computer 200 using the same virtual medium name as that of the source tape. Accordingly, after the replacement of tape generations in the library apparatus 100, the host computer 200 can transmit a request and confirm a response without being affected by the replacement of tape generations or performing a data updating process.

Although this embodiment has been described with respect to the case where magnetic tapes and drives of different generations of the single standard (LTO system), the standard is not limited to this one. Magnetic tapes of another standard, such as digital linear tape (DLT) or digital data storage (DDS), may be used. Alternatively, tapes of those standards may be mixed and used. Furthermore, priority levels may be assigned to different standards or generations of the different standards. During a transfer process, data may be transferred between magnetic tapes of the different generations or those of the different generations of the different standards.

Although this embodiment has been described with respect to the case where the magnetic tapes and the drives for the magnetic tapes are used, media and drives are not limited to those. Another storage medium, e.g., an optical disc such as a CD-R/W, a DVD-R/W, or a DVD-RAM, a magnetic disk such as an HDD, or a large-capacity semiconductor memory may be used. In addition, those media may be mixed and used. During a transfer process, data may be transferred between those different storage media.

As described above, in the library apparatus 100 according to the second embodiment, the I/F conversion unit 113 receives a request from the host computer 200 and converts a virtual medium name included in the request to a real medium name on the basis of the medium name conversion information. The conveying mechanism control unit 112 controls conveyance of a tape on the basis of the real medium name. Consequently, if the real medium name of a tape has been changed in the library apparatus 100 because of, for example, the transfer of data from an old generation tape to a new generation tape, the host computer 200 does not have to change the virtual medium name of the tape. Thus, an increase in burden of tape generation management can be suppressed.

When the volume management unit 111 performs data transfer so that all of data stored in a source tape to a destination tape, the virtual medium name of the source tape is related to a real medium name of the destination tape on the basis of the medium name conversion information. Consequently, when the library apparatus 100 transfers data stored in an old generation tape to a new generation tape, the virtual medium name used in the library apparatus 100 is updated in the medium name conversion information. Thus, an increase in burden of tape generation management can be suppressed.

When data transfer is performed, the conveying mechanism control unit 112 controls the conveying mechanism unit 130 so that the conveying mechanism 130 conveys the latest generation tape, serving as a destination tape, to one of the drives 120. Thus, the replacement of tape generations can be achieved upon data transfer.

The conveying mechanism control unit 112 also controls the conveying mechanism unit 130 so that after the data transfer, the destination tape is stored in a position where the source tape was stored in the cartridge tape cabinet 140. Thus, the position of the tape in the cartridge tape cabinet 140 can be changed upon data transfer.

When data reading/writing is performed on a tape, the conveying mechanism control unit 112 controls the conveying mechanism unit 130 so that the conveying mechanism 130 conveys the tape to the latest generation drive of drives available for data reading/writing. Consequently, the frequency of use of an old generation drive can be reduced in the library apparatus 100, thus accelerating the replacement of drive generations.

The I/F conversion unit 113 converts the real medium name of a tape, on which data reading/writing has been performed in response to a request from the host computer 200, to the virtual medium name on the basis of the medium name conversion information and transmits a report to the request. Consequently, when the library apparatus 100 transfers data stored in an old generation tape to a new generation tape, the host computer 200 does not have to change the virtual medium name of the tape. Thus, an increase in burden of tape generation management can be suppressed.

The I/F conversion unit 113 receives a request from the host computer 200 and converts a virtual drive name included in the request to the corresponding real drive name on the basis of drive name conversion information. Consequently, when the real drive name of a drive is changed in the library apparatus 100, the host computer 200 does not have to change the virtual drive name of the drive. Thus, an increase in burden of drive generation management can be suppressed.

What is claimed is:

1. A library apparatus for receiving a read/write request from a host to read/write data from/to a storage device, the apparatus comprising:

a medium name storage unit that stores medium name conversion information in which a virtual medium name specifying a storage medium in the read/write request, is related to a real medium name specifying the storage medium in the library apparatus;

a conveying mechanism unit that conveys the storage medium;

a drive that reads/writes data from/to the storage medium conveyed by the conveying mechanism unit in response to the received read/write request;

a conversion unit that converts the virtual medium name included in the received read/write request to the real medium name on the basis of the medium name conversion information stored in the medium name storage unit; and a conveying mechanism control unit that controls the conveying mechanism unit to convey the storage medium having the real medium name converted by the conversion unit to the drive, wherein the apparatus includes storage mediums of different generations, drives of different generations accepting the storage mediums of different generations and a generation compatibility information storage section configured to store generation compatibility information indicating which generation of the storage mediums is available for each of the drives of different generations, the conveying mechanism control unit controls the conveying mechanism unit so that the conveying mechanism unit conveys the storage medium to the latest generation drive of the drives available for reading/writing data from/to the storage medium according to the generation compatibility information, and the latest generation drive reads/writes data from/to the storage medium conveyed by the conveying mechanism unit in response to the read/write request.

2. The apparatus according to claim 1, further comprising a management unit that, when data stored in a source storage medium is transferred to a destination storage medium, updates the medium name conversion information stored in the medium name storage unit so that the virtual medium name of the source storage medium is related to the real medium name of the destination storage medium.

3. The apparatus according to claim 2, wherein storage mediums of different generations are available, when the data stored in the source storage medium is transferred to the destination storage medium, the conveying mechanism control unit controls the conveying mechanism unit so that the conveying mechanism unit conveys the latest generation storage medium of the storage mediums as the destination storage medium to the drive.

4. The apparatus according to claim 2, further comprising a cabinet that stores each storage medium in each storage position, wherein the conveying mechanism control unit controls the conveying mechanism unit to store the destination storage medium in a storage position of the source storage medium when transfer of the data stored in the source storage medium is completed.

5. The apparatus according to claim 1, wherein the conversion unit converts the real medium name of the storage medium, on which a reading or writing process has been performed in response to the read/write request, to the virtual medium name on the basis of the medium name conversion information stored in the medium name storage unit and transmits a response to the read/write request.

6. The apparatus according to claim 1, further comprising a drive name storage unit that stores drive name conversion information in which a virtual drive name specifying the drive in the read/write request is related to a real drive name specifying the drive, wherein the conversion unit receives the read/write request from the host and converts the virtual drive name included in the read/write request to the real drive name on the basis of the drive name conversion information stored in the drive name storage unit, and the conveying mechanism control unit controls the conveying mechanism unit so that the conveying mechanism unit conveys the storage medium to the drive specified by the real drive name converted by the conversion unit.

7. The apparatus according to claim 2, wherein, when the virtual medium name in a write request from the host is not included in the medium name conversion information, the management unit obtains the real medium name of the storage medium of the latest generation and creates the medium name conversion information in which the obtained real medium name of the storage medium is related to the virtual medium name.

* * * * *